(12) United States Patent
Harada

(10) Patent No.: US 10,158,801 B2
(45) Date of Patent: Dec. 18, 2018

(54) IMAGE CAPTURING APPARATUS COMMUNICATING WITH AN EXTERNAL APPARATUS AND METHOD FOR CONTROLLING THE SAME AND STORAGE MEDIUM

(71) Applicant: CANON KABUSHIKI KAISHA, Tokyo (JP)

(72) Inventor: Sayaka Harada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/491,768

(22) Filed: Apr. 19, 2017

(65) Prior Publication Data

US 2017/0310896 A1 Oct. 26, 2017

(30) Foreign Application Priority Data

Apr. 25, 2016 (JP) ................................ 2016-087388

(51) Int. Cl.
*H04N 5/232* (2006.01)
*H04N 5/44* (2011.01)

(52) U.S. Cl.
CPC ..... *H04N 5/23245* (2013.01); *H04N 5/23206* (2013.01); *H04N 5/23216* (2013.01); *H04N 5/23241* (2013.01); *H04N 5/44* (2013.01)

(58) Field of Classification Search
CPC .............................. H04N 5/23245; H04N 5/44
See application file for complete search history.

(56) References Cited

U.S. PATENT DOCUMENTS 7,362,227 B2 * 4/2008 Kim ..................... G06F 21/88
  340/539.1
8,185,756 B2 * 5/2012 Okamoto .............. G06F 1/3203
  713/300

FOREIGN PATENT DOCUMENTS

JP         2015-100001 A      5/2015

* cited by examiner

*Primary Examiner* — Padma Haliyur
(74) *Attorney, Agent, or Firm* — Cowan, Liebowitz & Latman, P.C.

(57) ABSTRACT

An image capturing apparatus comprises: a communication unit configured to communicate with an external apparatus; an operating unit; a control unit configured to receive operation regarding a predetermined function from the external apparatus via the communication unit and to receive operation regarding a predetermined function from a user via the operating unit; and a power source for supplying electrical power to the control unit; wherein if electrical power is supplied from the power source due to start of communication with the external apparatus, the control unit performs control to disable the reception of operation by the operating unit according to the function whose operation has been received from the external apparatus.

15 Claims, 6 Drawing Sheets

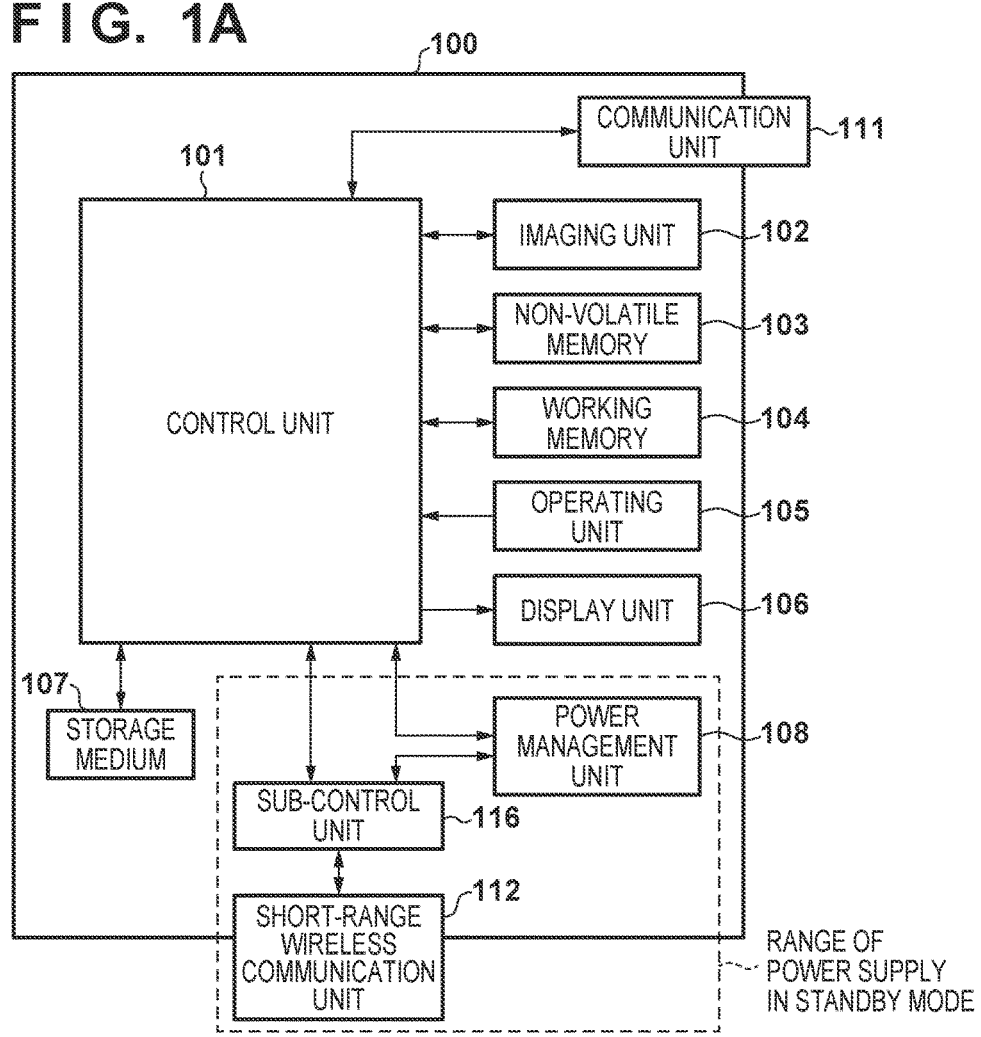
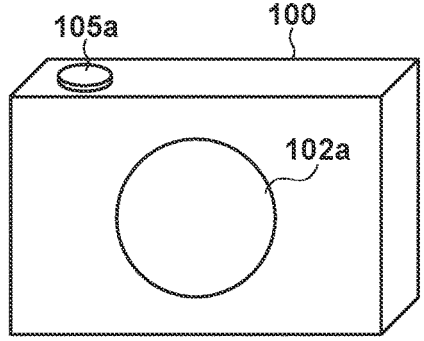
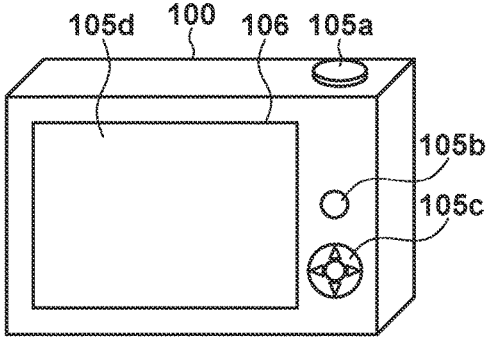

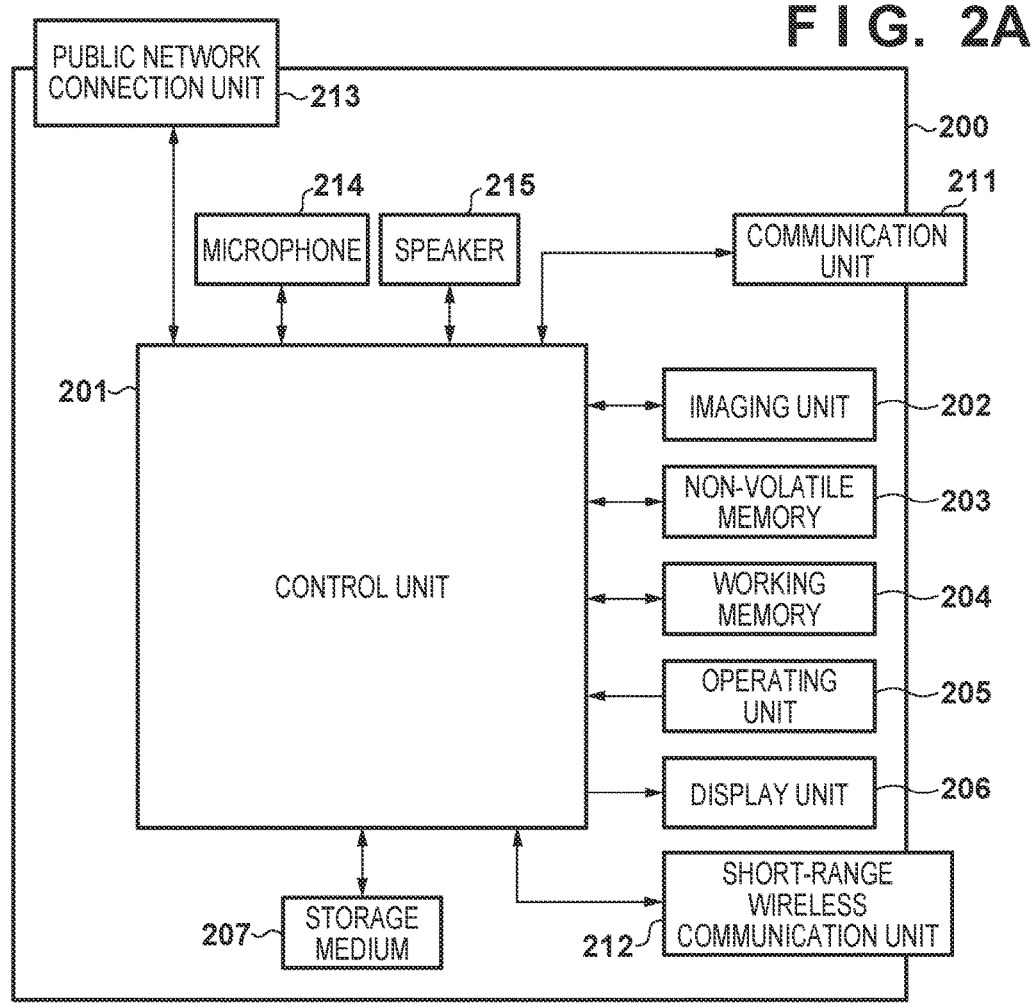
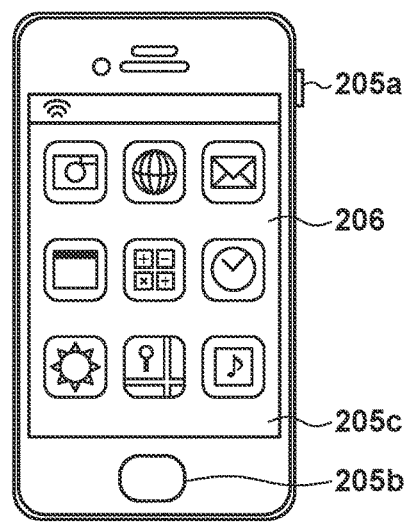

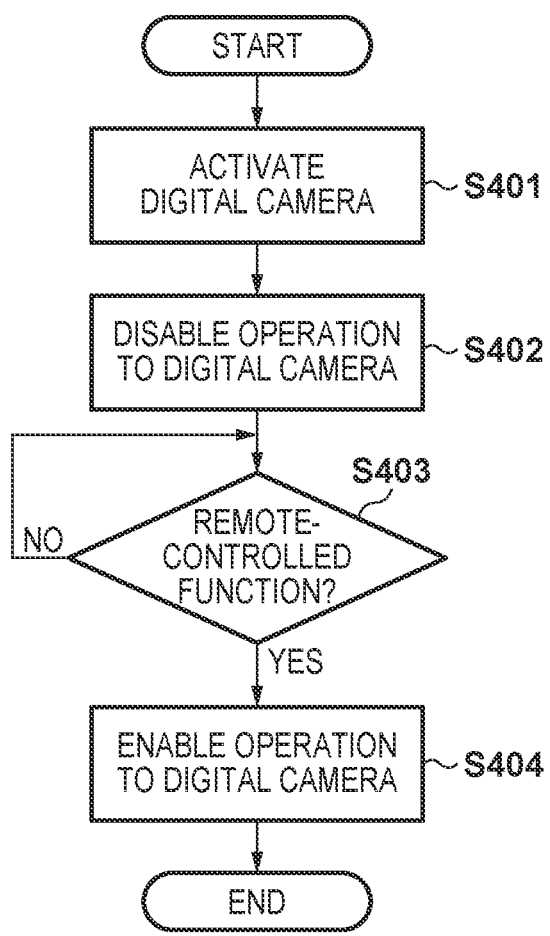

IMAGE CAPTURING APPARATUS COMMUNICATING WITH AN EXTERNAL APPARATUS AND METHOD FOR CONTROLLING THE SAME AND STORAGE MEDIUM

BACKGROUND OF THE INVENTION

Field of the Invention

The present invention relates to an image capturing apparatus and a method for controlling the same and a storage medium.

Description of the Related Art

In recent years, digital cameras have been known that are operable from external devices (for example, smart phones) connected via wireless LAN (Local Area Network) or Bluetooth®. In this way, a user of a smart phone can operate the smart phone to transmit images to a digital camera or capture images with a digital camera.

If a digital camera is connected to a smart phone, a state can be generated in which operation can be performed from the operating members of the digital camera and the smart phone. Japanese Patent Laid-Open No. 2015-100001 proposes a technology to disable user operation to a predetermined operating member of a digital camera or a smart phone in order to prevent a wrong operation due to inadvertent contact by a user with any of the operating members.

A different technology is also known to activate and communicate with an apparatus placed in a standby mode to communicate between a plurality of apparatuses. This enables a smart phone to activate a digital camera in a standby mode to establish communication between the smart phone and the digital camera.

If a digital camera tucked out of sight, such as in a bag, is activated by being connected to a smart phone, an operation not intended by the user may caused by an inadvertent operation of a button or touch panel of an operating member of the digital camera.

SUMMARY OF THE INVENTION

The present invention has been made in consideration of the aforementioned problems, and realizes a technology that can prevent operating errors due to physical contact with an operating member according to the manner of its use when activation is effected for operation from an external apparatus.

In order to solve the aforementioned problems, one aspect of the present invention provides an image capturing apparatus comprising: a communication unit configured to communicate with an external apparatus; an operating unit; a control unit configured to receive operation regarding a predetermined function from the external apparatus via the communication unit and to receive operation regarding a predetermined function from a user via the operating unit; and a power source for supplying electrical power to the control unit; wherein if electrical power is supplied from the power source due to start of communication with the external apparatus, the control unit performs control to disable the reception of operation by the operating unit according to the function whose operation has been received from the external apparatus.

Another aspect of the present invention provides a control method of an image capturing apparatus which comprises: a communication unit configured to communicate with an external apparatus; an operating unit; a control unit; and a power source for supplying electrical power to the control unit; the method causing: the control unit to: receive operation regarding a predetermined function from the external apparatus via the communication unit; and receive operation regarding a predetermined function from a user via the operating unit; wherein if electrical power is supplied from the power source due to start of communication with the external apparatus, the control unit performs control to disable the reception of operation by the operating unit according to the function whose operation has been received from the external apparatus.

Still another aspect of the present invention provides a non-transitory computer-readable storage medium storing a computer program, for causing a computer to function as the image capturing apparatus comprising: a communication unit configured to communicate with an external apparatus; an operating unit; a control unit configured to receive operation regarding a predetermined function from the external apparatus via the communication unit and to receive operation regarding a predetermined function from a user via the operating unit; and a power source for supplying electrical power to the control unit; wherein if electrical power is supplied from the power source due to start of communication with the external apparatus, the control unit performs control to disable the reception of operation by the operating unit according to the function whose operation has been received from the external apparatus.

According to the present invention, operating errors due to physical contact with an operating member can be prevented according to the manner of its use when activation is effected for operation from an external apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1A is a block diagram showing an illustrative functional configuration of a digital camera that serves as an exemplary image capturing apparatus of an embodiment according to the present invention.

FIGS. 1B and 1C are views showing external appearances of the digital camera of FIG. 1A.

FIG. 2A is a block diagram showing an illustrative functional configuration of a smart phone that serves as an example of an information processing apparatus of the first embodiment of the present invention.

FIG. 2B is a view showing an external appearance of the smart phone of FIG. 2A.

FIG. 4 is a flowchart showing a series of operations of the digital camera of the first embodiment.

DESCRIPTION OF THE EMBODIMENTS

First Embodiment

Figure 3A:
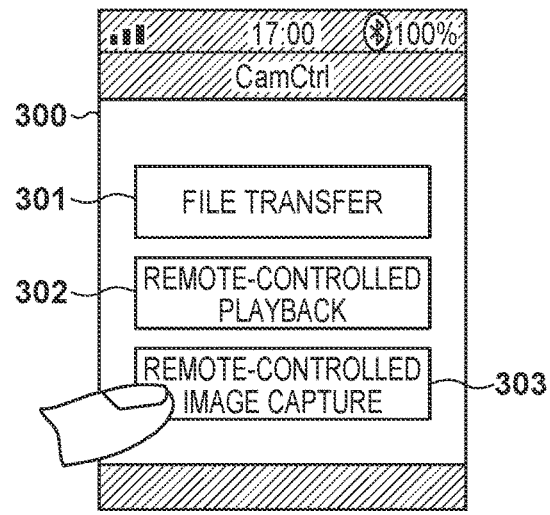
FIGS. 3A-3C are schematic views showing exemplary displays on the screen of the smart phone of the first embodiment.

Exemplary embodiments of the present invention will be described in detail hereinafter with reference to the attached drawings. It should be noted that the following describes, as an example of an image capturing apparatus, a digital camera that can be operated from an external apparatus. However, this embodiment can be applied not only to a digital camera but also to any apparatuses that can be operated from an external apparatus to capture images or operate on captured images, etc. These apparatuses may include, for example, mobile telephones including smart phones, personal computers, game machines, tablet terminals, watch-type information terminals, and eyeglass-type information terminals including head-mount displays. It should be noted that the following embodiments describe a smart phone as an example of such an information processing apparatus. However, this embodiment can be applied not only to a smart phone but also to any apparatuses capable of remotely operating other apparatuses. These other devices and apparatuses may include such stationary equipment as television sets and printers and any other apparatuses described above, such as personal computers.

Configuration of Digital Camera 100

FIG. 1A is a block diagram showing an illustrative functional configuration of a digital camera 100 that serves as an exemplary image capturing apparatus of this embodiment. One or more of the functional blocks shown in FIG. 1A may be implemented by hardware, such as an ASIC, a programmable logic array (PLA) or may be implemented by a programmable processor, such as a CPU or MPU, executing software. Alternatively, such a block(s) may also be implemented by the combination of software and hardware. Accordingly, in the description that follows, even separate functional blocks are described as the main body for performing certain processes, they can be implemented by the same piece of hardware as the main body.

The control unit 101, for example, includes a CPU (MPU) that performs various functions, such as executing programs stored in the non-volatile memory 103 to control the operation of the various blocks of the digital camera 100 and control the transmission of data among the blocks. The control unit 101 can also control the operation of the various blocks of the digital camera 100 according to the operating signal from the operating unit 105 that receives user operation.

The image capturing unit 102 includes, for example, an optical system that include s an optical lens unit capable of controlling the lens aperture, zoom, and focus and an image sensor for converting light (an image) introduced by the optical lens unit into an electric image signal. The image sensor is configured to have multiple pixels of photoelectric conversion elements arranged in a two-dimensional array. For example, the image sensor may be a CMOS (Complementary Metal Oxide Semiconductor) or a CCD (Charge Coupled Device). In response to an instruction from the control unit 101, the image capturing unit 102 causes the image sensor to convert the image of an object formed by the optical system included in the image capturing unit 102 into an electric signal and performs noise reduction for subsequent output of the digital data as image data. Such image data is recorded on a storage medium 107 in a format conforming to, for example, the DCF (Design rule for Camera File system) standard.

The non-volatile memory 103 includes a memory on which information can be electrically deleted or recorded in a non-volatile manner so as to store, for example, programs for execution by the control unit 101. For example, these programs include basic software, such as an OS (operating system), and applications that cooperate with the OS to implement applied functions. The working memory 104 includes a volatile memory that, for example, serves as: a buffer memory for temporarily holding the data of images captured by the image capturing unit 102; a memory for displaying images on a display unit 106; and a working area for the control unit 101.

The operating unit 105 includes operating members of the digital camera 100, such as buttons and switches, and a touch panel, etc., provided on the display unit 106, which will be described in further detail below, so as to receive instructions for the digital camera 100 from a user. The operating unit 105 includes, for example, a power-switch button for providing ON/OFF instructions for the main power source, including power supply to the control unit 101, and a release switch for providing instructions to capture images, and a playback button for providing instructions to play back image data. The operating unit 105 includes additional operating members, such as a connection button for establishing communication with an external apparatus via a communication unit 111, which will be described in further detail below. It should be noted that the release switch has SW1 and SW2, which enable stepwise depression control. In particular, SW1 is turned ON when the release switch is placed into the so-called half-pushed state. This allows the camera to receive instructions for preparation of image capturing, such as AF (auto focus) processing, AE (auto exposure) processing, AWB (auto white balance) processing, and EF (flash pre-emission). In addition, SW2 is turned ON when the release switch is placed into the so-called fully-pushed state. The control unit 101 determines that an instruction to capture an image has been received from the user when SW2 is turned ON.

The display unit 106 shows a viewfinder image during image capturing, the data of an image that has been captured, interactive operation menus, characters and symbols, and so on. It should be noted that the display unit 106 need not be incorporated in the digital camera 100. It will be sufficient if the digital camera 100 can be connected to an internal or external display unit 106 and has at least display control functionality that controls the image display on the display unit 106.

The storage medium 107 includes a non-volatile memory that stores image data output by the image capturing unit 102. The storage medium 107 may be configured to be detachably mounted in the digital camera 100 or may be integrated within the digital camera 100. In other words, it will be sufficient or serve the purpose of this embodiment if the digital camera 100 is provided with a means to access at least the storage medium 107.

The power management unit 108 includes a unit for supplying power to operate the digital camera 100. In addition to supplying power to the entire digital camera 100, the power management unit 108 can supply power only to a sub-control unit 116 and a short-range wireless communication unit 112, which will be described below. In this embodiment, the operating mode in which power is supplied to the entire digital camera 100 is referred to as a power ON mode whereas the operating mode in which power is supplied only to the sub-control unit 116 and the short-range wireless communication unit 112 is referred to as a standby mode. In addition, the operating mode in which no power is supplied to any part of the digital camera 100 is referred to as a power OFF mode. In the standby mode, the power consumption of the digital camera 100 can be kept extremely low.

The communication unit 111 includes an interface for communicating with an external apparatus, such as a smart phone 200, to transmit and receive data to and from the external apparatus. The control unit 101 can, for example, transmit image data generated at the image capturing unit 102 to the external apparatus via the communication unit 111 and receive (e.g., download) predetermined data from the external apparatus. The communication unit 111 includes an interface for communicating with the external apparatus via so-called wireless LAN, which conforms to the IEEE 802.11 standard.

The short-range wireless communication unit 112 includes an antenna for wireless communication, a modulator-demodulator circuit for processing wireless signals, and a communication controller. The short-range wireless communication unit 112 realizes short-range wireless communication that conforms to the IEEE 802.15 standard (so-called Bluetooth®) by outputting modulated wireless signals via the antenna and demodulating wireless signals received via the antenna. For example, Bluetooth® Low Energy or Bluetooth® Version 4.0 (also simply called "BLE"), which has a low power consumption, is used in this embodiment. Bluetooth® has a shorter communication range (or a shorter distance of communication) and a lower communication speed than wireless LAN. Meanwhile, Bluetooth® communication consumes less power than wireless LAN. The control unit 101 is capable of communicating data with the external apparatus via the short-range wireless communication unit 112. Upon receiving from the external apparatus an instruction to capture an image, for example, the control unit 101 controls the image capturing unit 102 to perform image capturing. Furthermore, when receiving an instruction for transmitting/receiving data at the short-range wireless communication unit 112 via wireless LAN communication, the control unit 101 controls the communication unit. 111 to start wireless LAN communication. In addition, as described above, since the short-range wireless communication unit 112 is capable of operating in the standby mode, this communication unit can receive an instruction to turn ON the power source of the digital camera 100 from the external apparatus in the standby mode. This allows the digital camera 100 to start supplying power to the entire digital camera 100 via the sub-control unit 116, which will be further described below.

The sub-control unit 116 includes a device that controls the short-range wireless communication unit 112 to control short-range wireless communication with the external apparatus. Similarly to the short-range wireless communication unit 112, the sub-control unit 116 can operate in the standby mode. Accordingly, when an instruction to turn ON the power source of the digital camera 100 is received from the external apparatus via the short-range wireless communication unit 112, the power management unit 108 can be controlled to start power supply to the entire digital camera 100.

The external appearance of the exemplary digital camera 100 will be described below with reference to FIGS. 1B and 1C. FIG. 1B shows an image capturing unit 102 disposed on the front of the digital camera 100. Moreover, a release switch 105a is integrated, for example, in the operating unit 105 and arranged on the top of the digital camera 100 to be depressed, for example, by being brought into contact with an external object. The operating unit 105 and/or the release switch 105a does not have to be located in the front or top as above; rather, they may be located in any suitable positions and formed in any suitable sizes. Additionally, as shown in FIG. 1C, provided on the back of the digital camera 100 are a playback button 105b, a direction key 105c, a touch panel 105d, etc., which constitute part of the operating unit 105, as well as a display unit 106. As in the members described in connection with FIG. 1B, any or all of the members 105b, 105c, and 105d may be located in any suitable positions and formed in any suitable sizes.

Configuration of Smart Phone 200

FIG. 2A is a block diagram showing an illustrative functional configuration of a smart phone 200 that serves as an exemplary information processing apparatus of the present embodiment. As in the case of the functional blocks of FIG. 1A, one or more of the functional blocks shown in FIG. 2A may be implemented, for example, by the combination of software and hardware.

The control unit 201, for example, includes a CPU (MPU)) that performs various functions, such as executing programs stored in the non-volatile memory 203 to control the operation of the various blocks of the smart phone 200 and control the transmission of data among the blocks. The control unit 201 can also control the operation of the various blocks of the smart phone 200 according to the operating signal from the operating unit 205 that receives user operation.

In response to an instruction from the control unit 201, the image capturing unit 202 converts the light of an object imaged by the lens included in the image capturing unit 202 into an electric signal and performs noise reduction processing for subsequent output of the digital data as image data. After being stored in the buffer memory, the image data is subjected to predetermined operations at the control unit 201 and then recorded on the storage medium 207.

The non-volatile memory 203 is a memory on which information can be electrically deleted or recorded in a non-volatile manner. The non-volatile memory 203 stores an OS executed by the control unit 201 and applications that cooperate with the OS. The applications stored in the non-volatile memory 203 include applications (hereinafter simply referred to as "apps") for communication with the digital camera 100. The working memory 204 includes a volatile memory that, for example, serves as a memory for displaying images on the display unit 206 and provides a working area for the control unit 201.

The operating unit 205 includes operating members of the smart phone 200, such as a power-switch button for providing ON/OFF instructions for the power source and a touch panel, etc., provided on the display unit 206 so as to receive instructions for the smart phone 200 from a user. The instructions for the smart phone 200 include those for remotely operating the digital camera 100 connected thereto.

The display unit 206 displays image data, interactive operation menus, characters and symbols, and so on. It should be noted that the display unit 206 may be provided separately from and external to the smart phone 200. It will be sufficient if the smart phone 200 can be connected to the display unit 206 and have at least display control functionality that controls the display on the display unit 206.

The storage medium 207 includes a non-volatile memory that stores image data output by the image capturing unit 202. The storage medium 207 may be configured to be detachably mounted in the smart phone 200 or may be integrated within the smart phone 200. In other words, it will be sufficient or serve the purpose of this embodiment if the smart phone 200 is provided with a means to access at least the storage medium 207.

The communication unit 211 includes an interface and an antenna for communicating with an external apparatus, such as the digital camera 100, to transmit and receive data to and from the external apparatus. The control unit 201 is capable of exchanging data with the digital camera 100 via the communication unit 211. It should be noted that the smart phone may be connected with the digital camera 100 directly or via an access point. The communication unit 211 may employ a predetermined protocol, such as PTP/IP (Picture Transfer Protocol over Internet Protocol), via wireless LAN for data communication.

The short-range wireless communication unit 212 includes an antenna for wireless communication, a modulator-demodulator circuit for processing wireless signals, and a communication controller. The short-range wireless communication unit 212 realizes short-range wireless communication as described above with reference to the short-range wireless communication unit 112 of the digital camera 100 by outputting modulated wireless signals via the antenna and demodulating wireless signals received via the antenna.

To communicate with the digital camera 100 wirelessly in a short range, initially, the smart phone needs to connect to the short-range wireless communication unit 112 of the digital camera 100 by operation to establish a 1:1 connection for short-range wireless communication (referred to as "paring"). In paring, for example, the digital camera 100 advertises or makes its presence known as a peripheral to other apparatuses/devices in the surroundings (using the short-range wireless communication unit 112). In the meantime, the smart phone 200 finds the digital camera 100 by performing scanning as the central (using the short-range wireless communication unit 212). Subsequently, each of the apparatuses establishes short-range wireless communication after making a participation request by initiation. The term "pairing" is sometimes employed exclusively in association with Bluetooth® connection, which involves encryption; according to the present embodiment, however, pairing refers to the operation and processing to establish a 1:1 connection using short-range wireless communication whether or not it involves encryption.

The public network connection unit 213 includes an interface and an antenna used for performing public wireless communication. The smart phone 200 is capable of making calls and communicating data with other apparatuses via the public network connection unit 213. The control unit 201, when making a call via the public network connection unit 213, receives and generates audio signals via the microphone 214 and the speaker 215. The communication unit 211 and the public network connection unit 213 may be configured to share a single antenna.

The external appearance of an exemplary smart phone 200 will be described below with reference to FIG. 2B. In the smart phone 200, for example, a home button 205*b* and a touch panel 205*c* are arranged on the front with a power-switch button 205*a* on one side of the phone, all of which constitute part of the operating unit 205. A user may interrupt an application during its execution by depressing the home button 205*b* to display the home screen on the display unit 206 (the touch panel 205*c*), where the user may select from a set of applications. The members included in the operating unit 205 and the display unit 206 may be located in any suitable positions and have any suitable sizes.

Remote Operation of Digital Camera 100

Next, a series of operations to remotely operate the digital camera 100 from the smart phone 200 to perform various functions will be described below with reference to FIGS. 3A-3C, 4 and 5. In this embodiment, file transfer, remote-controlled image capture, and remote-controlled playback functions will be described as examples of the functions that can be performed by remotely operating the digital camera 100 with the smart phone 200.

The file transfer function of this embodiment employs BLE communication to establish Wi-Fi connection to transfer images from the digital camera 100 to the smart phone 200. More specifically, the user initially establishes BLE communication between the smart phone 200 and the digital camera 100 by bringing the smart phone 200 and the digital camera 100 close together until they are in the communication range of BLE. Next, the smart phone 200 and the digital camera 100 establish Wi-Fi communication with each other by transmitting and receiving information necessary to perform Wi-Fi communication using BLE communication (this method of establishing communication is called handover). In addition, the smart phone 200 and the digital camera 100 use the Wi-Fi communication thus established to transfer a designated image stored in the digital camera 100 to the smart phone 200. During the file transfer, upon establishing Wi-Fi communication, the digital camera 100 may first transmit to the smart phone 200 information necessary for file selection, followed by the user operation to specify a file based on this information for file selection. In this way, the file transfer function allows the user to capture images stored in the digital camera 100 into the smart phone 200 by operating the smart phone 200 only.

The remote-controlled image capture and remote-controlled playback functions (also simply and collectively called the remote-controlled functions) allow the user to remotely operate the digital camera 100 from the smart phone 200 to cause the digital camera 100 to perform image capturing and playback. To use the remote-controlled functions, the user may also establish Wi-Fi communication between the smart phone 200 and the digital camera 100 through the above-described handover and then remotely operate the digital camera 100 from the smart phone 200.

Figure 3B:
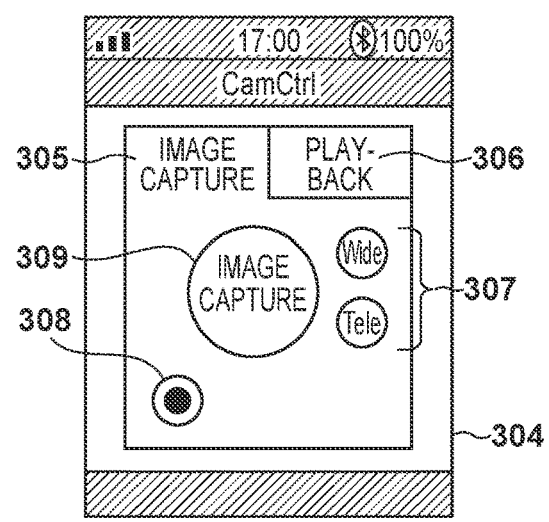
Figure 3C:
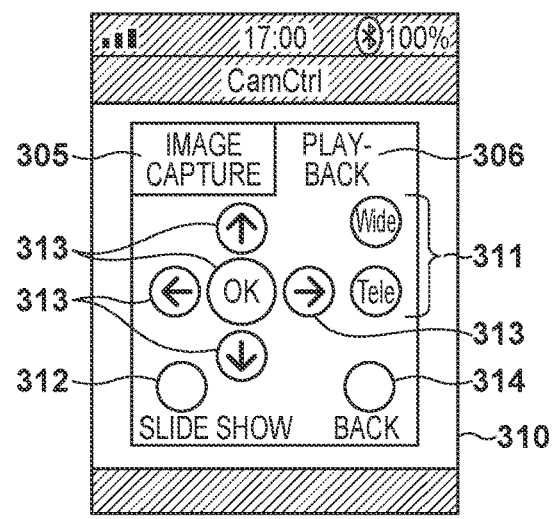

The user performs the foregoing file transfer, remote-controlled image capture, and remote-controlled playback functions via the exemplary user interface screens shown, for example, in FIGS. 3A-3C. FIG. 3A shows an example of a screen 300 where the user may select a function for performing remote operation. From the screen 300, the user can choose to operate one of the three buttons: the button 301 for initiating the "File Transfer" function; the button 302 for initiating the "Remote-Controlled Playback" function; and the button 303 for initiating the "Remote-Controlled Image Capture" function. In response to the user depressing one of the buttons, the smart phone 200 and the digital camera 100 perform the above-described handover and also place the digital camera 100 in the mode that corresponds to the function. For example, if the button 301 for the "File Transfer" function is selected, Wi-Fi communication is established through BLE communication to place the digital camera 100 in the file transfer mode so as to perform image transfer.

FIG. 3B shows an example of a screen 304 for performing remote-controlled image capture to which the user is brought from the screen of FIG. 3A upon selection of the "Remote-Controlled Image Capture" function. The screen 304, for example, includes a tab 305 and a tab 306 for switching between the remote-controlled image capture function and the remote-controlled playback function. If the tab 305 for the remote-controlled image capture function is selected, the display unit shows, for example, screen displays buttons 307 for adjusting the zoom of the digital camera 100, an image-shooting button 309 for taking still pictures, a video recording button 308 for starting video recording, etc. The smart phone 200 transmits to the digital camera 100 the command that corresponds to the button operated by the user, causing the digital camera 100 to perform the corresponding operation. In this example, the operations selectable from the screen 304 are limited, so that the user cannot fully change or adjust the settings of the digital camera 100 for image capturing as can be done by directly operating the digital camera 100. Accordingly, while the user needs to operate the operating unit 105 of the digital camera 100 to make the necessary changes to the settings for image capturing so as to fully utilize the functions offered by the operating unit 105 of the digital camera 100, the user uses the smart phone 200 to mainly trigger still-image capturing and video recording only (and changes to part of the settings).

FIG. 3C shows an example of a screen 310 for performing the remote-controlled playback function to which the user is brought from the screen of FIG. 3A upon selection of the "Remote-Controlled Playback." As in the screen 304, the screen 310, for example, includes a tab 305 and a tab 306 for switching between the remote-controlled image capture function and the remote-controlled playback function. If the tab 306 for the remote-controlled playback function is selected, the screen displays, for example, buttons 311 for adjusting the zoom during playback, a button 312 for starting a slide show, and buttons 313 for selecting the file to play back and for controlling playback operation, a return button 314, etc. The remote-controlled playback function according to this embodiment enables the user to perform from the smart phone 200 the image playback functions of the digital camera 100 including image forward, scaling, multi-playback, and video playback. In the foregoing example, while the digital camera 100 features editing functions as part of the playback function, editing cannot be done on the smart phone 200. Alternatively, however, the smart phone 200 may be configured to display a button(s) to perform editing functions so that editing is possible also from the smart phone 200.

To perform the above-described file transfer function, it is not necessary for the user to operate the operating unit 105 of the digital camera 100. Using this file transfer function, the user can easily obtain data stored in the digital camera 100 while keeping the digital camera 100, for example, in a bag (i.e., without having to manipulate the digital camera 100). However, if the operating unit 105 of the digital camera 100 is capable of receiving operation during the execution of the file transfer function, an operating error may result from an unexpected physical contact with the operating unit 105 while the digital camera is in the bag. For this reason, operation to the operating unit 105 of the digital camera 100 is disabled during the execution of the file transfer function. This not only allows the user to easily obtain data from the digital camera 100 but also prevents operating errors in the digital camera 100 due to an unexpected physical contact with the operating unit 105.

During the execution of the remote-controlled image capture function, operation to the operating unit 105 of the digital camera 100 is enabled to allow for changes to the image capture settings as during the normal operation of the digital camera 100. In this way, the digital camera 100 controls operation to the operating unit 105 to be enabled or disabled according to the function to be performed by remote operation. This can avoid disadvantages, such as the inability to change the image capture settings in the digital camera 100 (the inability to utilize all the otherwise available functions) during the execution of the remote-controlled image capture function.

As for the remote-controlled playback function, if the settings for still image playback and video playback can be made with the operating unit 105, it is preferable to enable the operation of the digital camera 100. Accordingly, in the embodiment below, an example is described in which during the execution of the remote-controlled playback function, operation to the digital camera 100 is also enabled as during the execution of the remote-controlled image capture function. However, if the operation can be completed without operating the digital camera 100, i.e., if operation to the digital camera 100 is not necessary, the button operation on the digital camera 100 may be disabled to prevent inadvertent operating errors.

A Series of Operations of Digital Camera 100 for Remote Operation

A series of operations of the digital camera 100 for remote operation will now be described with reference to FIG. 4. This series of operations may be started when the short-range wireless communication unit 112 of the digital camera 100 can communicate with the short-range wireless communication unit 212 of the smart phone 200 through BLE. It is assumed that one of the file transfer function, the remote-controlled image capture function, and the remote-controlled playback function is to be performed by an instruction from the smart phone 200. Additionally, unless otherwise specified, this series of operations are performed as the control unit 101 deploys and executes a program stored in the non-volatile memory 103 on the working memory 104.

In S401, the sub-control unit 116 activates the digital camera 100. As described above, communication is possible between the apparatuses via BLE communication even when the digital camera 100 is in the standby mode. In this way, BLE communication may cause the sub-control unit 116 to supply power to the control unit 101 and thus activate the digital camera 100. Upon the activation of the digital camera 100, the control unit 101 establishes Wi-Fi communication with the smart phone 200. In S402, the control unit 101 disables operation to the operating unit 105 of the digital camera 100.

In S403, the control unit 101 determines whether the remotely operated function is one of the remote-controlled functions. For example, the control unit 101 receives, from the smart phone 200 via the short-range wireless communication unit 112 or the communication unit 111, information for identifying the remotely operated function to be executed at the digital camera 100 and determines whether the remotely operated function is a remote-controlled function. If the remotely operated function is determined to be a remote-controlled function (i.e., the remote-controlled image capture function or the remote-controlled playback function), the control unit 101 lets the process proceed to S404. On the other hand, if the remotely operated function is determined not to be a remote-controlled function (that is, if it is the file transfer function), operation to the operating unit 105 of the digital camera 100 remains disabled and terminates this series of operations. In S404, the control unit 101 enables operation to the operating unit 105 of the digital camera 100 and terminates this series of operations.

In the foregoing example, operation to the operating unit 105 of the digital camera 100 is switched between enabled and disabled depending on whether one of the remote-controlled functions or the file transfer function is selected. However, the control unit 101 may additionally switch the operation to the digital camera 100 between enabled and disabled depending on whether the remote-controlled image capture function or the remote-controlled playback function is selected. Moreover, if the user operates the operating unit 105 of the digital camera 100 when operation to the operating unit 105 is disabled, a confirmation screen may be displayed on the display unit 106 of the digital camera 100 to provide the user with an opportunity to change the enabled/disabled condition. That is, if the user selects "Operate" (enable) in the confirmation screen, the control unit 101 may enable the operating unit 105 (i.e., cancel the disablement or disabled condition). In this case, once operation to the operating unit 105 is enabled, the operating unit 105 remains operable.

A Series of Operations of Smart Phone 200 for Remote Operation

Figure 5:
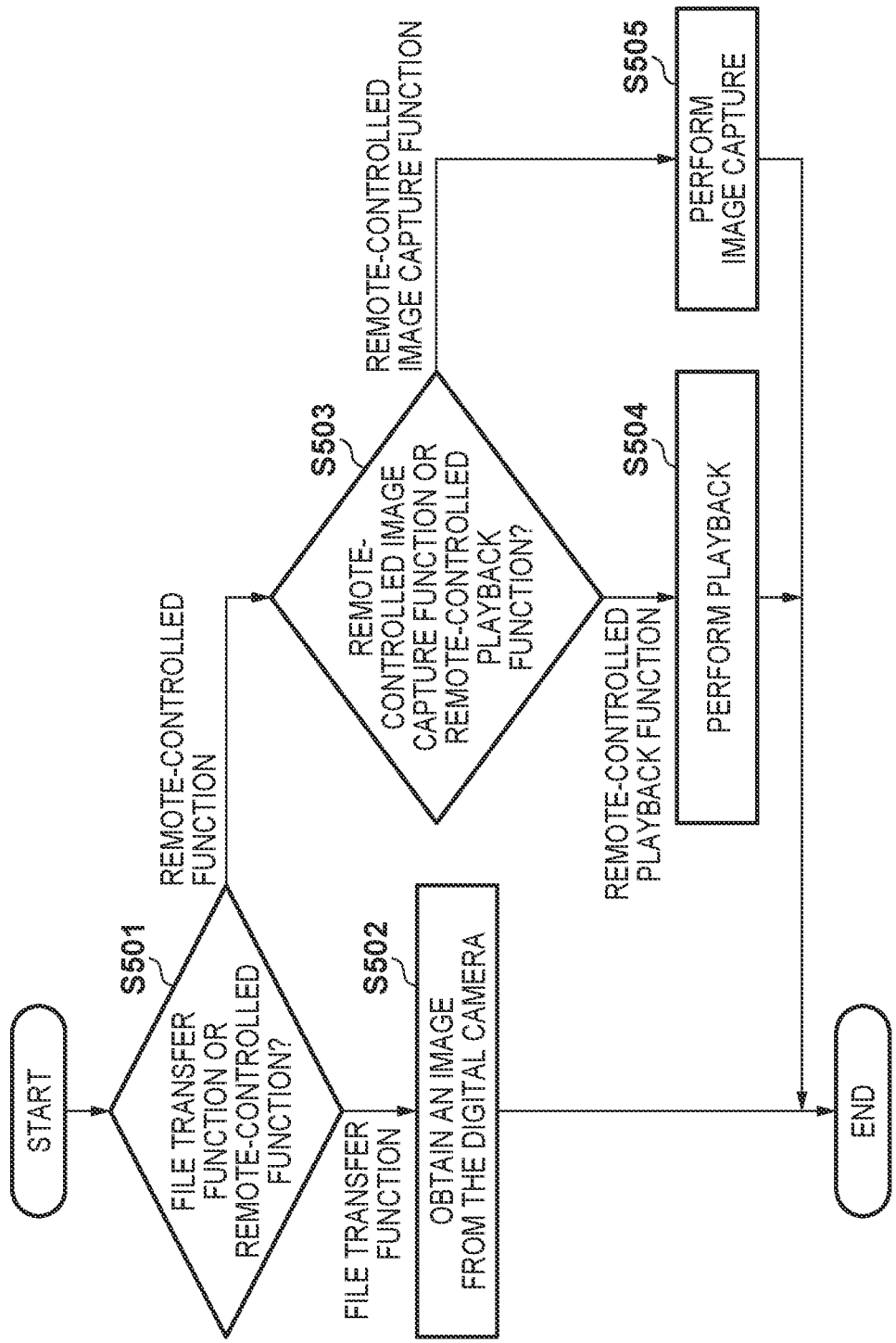
FIG. 5 is a flowchart showing a series of operations of the smart phone of the first embodiment.

A series of operations of the smart phone 200 for remote operation will now be described with reference to FIG. 5. This series of operations may be started when the short-range wireless communication unit 112 of the digital camera 100 can communicate with the short-range wireless communication unit 212 of the smart phone 200 through BLE and when one of the functions is selected from the screen 300 shown in FIG. 3A. Additionally, unless otherwise specified, this series of operations are performed as the control unit 201 deploys and executes a program stored in the non-volatile memory 203 on the working memory 204.

In S501, the control unit 201 determines whether the remotely operated function selected by the user on the screen shown in FIG. 3A is the file transfer function or one of the remote-controlled functions. If the function selected through the operating unit 205 is determined to be the file transfer function, the control unit 201 advances the process to S502. Conversely, if the selected function is determined to be one of the remote-controlled functions, the process proceeds to S503.

In S502, the control unit 201 performs the function to obtain an image from the digital camera 100. More specifically, the control unit 201 establishes Wi-Fi communication with the digital camera 100. In addition, the control unit 201 transmits information that indicates the specified remotely operated function is file transfer to the digital camera 100 via the short-range wireless communication unit 212 or the communication unit 211. Subsequently, an image is obtained from the digital camera 100 (i.e., the result of the action by the digital camera 100 is received) using Wi-Fi communication.

In S503, the control unit 201 additionally determines whether the remotely operated function is the remote-controlled playback function or the remote-controlled image capture function. If the remotely operated function specified through the operating unit 205 is determined to be the remote-controlled playback function, the control unit 201 advances the process to S504. Meanwhile, if the specified remotely operated function is determined to be the remote-controlled image capture function, the process proceeds to S505. In S504, the control unit 201 performs playback from the smart phone 200 based on the input to the operating unit 205 (i.e., transmit an instruction to the digital camera 100 to perform playback and receives the result of the action) and then terminates this series of operations. In S505, the control unit 201 performs image capture from the smart phone 200 based on the input to the operating unit 205 (i.e., transmit an instruction to the digital camera 100 to perform image capture and receives the result of the action) and then terminates this series of operations.

Moreover, in one implementation, operation for each remotely controlled function may be enabled or disabled according to the enable/disable setting on the menu included in the operating unit 105 of the digital camera 100. This provides for disabling operation to the operating unit 105 of the digital camera 100 according to the manner of use of the digital camera by the user, such as in the remote-controlled playback function (e.g., some user may choose not to operate the digital camera 100 during remote-controlled playback).

As described above, according to this embodiment, when the digital camera 100 is activated by the operation of the smart phone 200, user operation to the operating unit 105 of the digital camera 100 is enabled or disabled according to the remotely operated function to be performed. That is, if the remotely operated function is a remote-controlled function that requires no operation on the digital camera 100 side (e.g., the file transfer function), user operation to the operating unit 105 is disabled. In this way, operating errors due to unintended contact with the digital camera 100 can be prevented when the user is not handling the digital camera 100. Conversely, if the remotely operated function is a remote-controlled function that allows additional operation on the digital camera 100 side (for example, the remote-controlled image capture function), user operation to the operating unit 105 is enabled. In this way, the user can operate the digital camera 100 to gain full access to its functions when the user is handling the digital camera 100. This means that when the digital camera is activated for operation from an external apparatus, operating errors due to contact with the operating member can be prevented according to the manner of its use.

Second Embodiment

A second embodiment of the present invention will now be described with reference to FIG. 6. The first embodiment describes the case in which the digital camera 100 is powered on through handover with the smart phone 200. The second embodiment also describes the case in which the digital camera 100 is powered on by user operation of the operating unit 105. The configurations of the digital camera 100 and the smart phone 200 and the exemplary displays on the screen of the smart phone 200 are the same as those in the first embodiment. Accordingly, like members are designated by like reference characters and redundant description thereof is omitted to mainly describe the differences.

As described above, when the digital camera 100 is powered on through handover with the smart phone 200, the digital camera 100 may not be at hand and may be out of sight of the user. Accordingly, when the digital camera 100 is powered on through handover with the smart phone 200, operation to the digital camera 100 is switched between enabled and disabled depending on the function selected on the smart phone 200 according to the first embodiment. On the other hand, if the digital camera 100 is already powered on at the time of handover, it is likely that the digital camera 100 is being held or handled by the user. In this case, it is not necessary to disable operation to the operating unit 105 of the digital camera 100. Accordingly, in this embodiment, the determination of whether or not to enable operation to the operating unit 105 of the digital camera 100 is made depending on whether or not the digital camera 100 has been powered on through handover with the smart phone 200 (activation factor).

Figure 6:
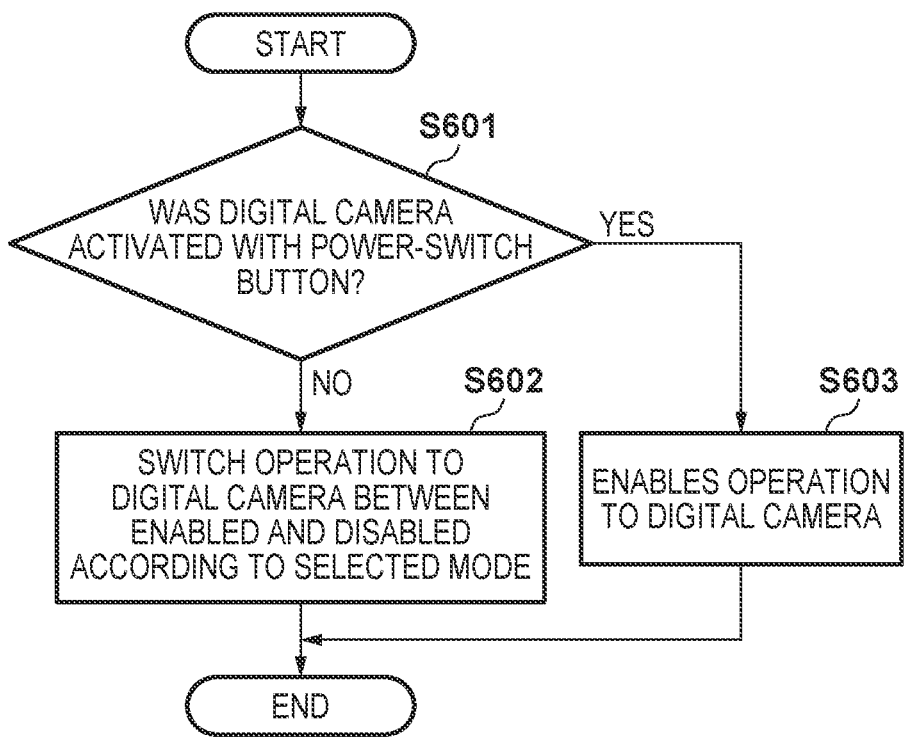
FIG. 6 is a flowchart showing a series of operations of the digital camera of the second embodiment.

With reference to FIG. 6, a series of operations will now be described to switch the operating unit 105 of the digital camera 100 between enabled and disabled according to the activation factor of the digital camera 100. This series of operations may be started when the short-range wireless communication unit 112 of the digital camera 100 can communicate with the short-range wireless communication unit 212 of the smart phone 200 through BLE and when one of the functions is selected from the screen 300 shown in FIG. 3A. Additionally, unless otherwise specified, this series of operations are performed as the control unit 101 deploys and executes a program stored in the non-volatile memory 103 on the working memory 104.

In S601, the control unit 101 determines whether the digital camera 100 has been activated with the power-switch button. More specifically, if the digital camera 100 is already powered on at the time of handover with the smart phone 200, the control unit 101 determines that the digital camera has been activated with the power-switch button of the operating unit 105 and advances the process to S603. Conversely, if it is determined that the digital camera 100 has been powered on through handover with the smart phone 200, the control unit 101 advances the process to S602. The determination as to the activation factor is performed, for example, by referring to a flag that is set by the sub-control unit 116 to indicate the activation factor when the activation is performed through handover via the sub-control unit 116.

In S602, as in the first embodiment, the control unit 101 switches the operation to the operating unit 105 of the digital camera 100 between enabled and disabled according to the remotely operated function selected on the smart phone 200. Subsequently, this series of operations is terminated. In S603, the control unit 101 enables operation to the operating unit 105 of the digital camera 100 and terminates this series of operations.

As has been described, according to this embodiment, operation to the operating unit 105 of the digital camera 100 is switched between enabled and disabled according to the activation factor of the power supply to the digital camera 100. This can effectively prevent operating errors according to the manner of operation of the digital camera 100 by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087388, filed Apr. 25, 2016 which is hereby incorporated by reference herein in its entirety.

What is claimed is:

1. An image capturing apparatus comprising:
 a communication interface configured to communicate with an external apparatus;
 an operating member;
 at least one processor; and
 a power source for supplying electrical power to the at least one processor;
 wherein the at least one processor functions as a control unit configured to receive operation regarding a predetermined function from the external apparatus via the communication unit interface and to receive operation regarding a predetermined function from a user via the operating member,
 wherein if electrical power is supplied from the power source due to start of communication with the external apparatus, the control unit performs control to disable the reception of operation by the operating member according to the function whose operation has been received from the external apparatus,
 wherein the control unit performs control to disable the reception of operation by the operating member if the function whose operation has been received from the external apparatus is a function to transfer a file from the image capturing apparatus, and the control unit performs control to enable the reception of operation by the operating member if the function whose operation has been received from the external apparatus is a function to capture or playback an image with the image capturing apparatus.

2. The apparatus according to claim 1, wherein the control unit performs control to disable the reception of operation by the operating member if the function whose operation has been received from the external apparatus requires no operation by the operating member when operated from the external apparatus.

3. The apparatus according to claim 1, wherein the control unit performs control to enable the reception of operation by the operating member if the function whose operation has been received from the external apparatus requires operation by the operating member when operated from the external apparatus.

4. The apparatus according to claim 1, the at least one processor further functions as a setting unit configured to make a setting, for the predetermined function, as to whether or not to disable the reception of operation by the operating member when operated from the external apparatus;
 wherein if a setting has been made by the setting unit, the control unit controls the reception of operation by the operating member according to the setting by the setting unit.

5. The apparatus according to claim 1, wherein if operation is performed to the operating member when the reception of operation by the operating member is disabled, the control unit performs control to display on a display a prompt as to whether or not to cancel the disablement of the reception of operation by the operating member.

6. The apparatus according to claim 5, wherein if the operating member receives operation to cancel the disablement of the reception of operation by the operating member, the control unit performs control to enable operation by the operating member.

7. The apparatus according to claim 1, wherein if communication is started with the external apparatus when electrical power is being supplied to the control unit in response to the display, the control member performs able operation by the operating member.

8. The apparatus according to claim 1, wherein the communication interface comprises a first communication interface and a second communication interface;
wherein the first communication interface is capable of communicating with the external apparatus when the apparatus is in a standby mode; and
wherein the second communication interface is controlled by the control unit to receive operation from the external apparatus and transmit predetermined data to the external apparatus.

9. The apparatus according to claim 1, wherein the first communication interface communicates with the external apparatus via short-range wireless communication, and
wherein the second communication interface communicates with the external apparatus via wireless LAN.

10. A control method of an image capturing apparatus which comprises: a communication interface configured to communicate with an external apparatus; an operating member; at least one processor; and a power source for supplying electrical power to the at least one processor; the method causing:
at least one processor to:
receive operation regarding a predetermined function from the external apparatus via the communication interface; and
receive operation regarding a predetermined function from a user via the operating member;
wherein if electrical power is supplied from the power source due to start of communication with the external apparatus, the method causing the at least one processor to perform control to disable the reception of operation by the operating member according to the function whose operation has been received from the external apparatus,
wherein the method causing the at least one processor to perform control to disable the reception of operation by the operating member if the function whose operation has been received from the external apparatus is a function to transfer a file from the image capturing apparatus, and method causing the at least one processor to perform control to enable the reception of operation by the operating member if the function whose operation has been received from the external apparatus is a function to capture or playback an image with the image capturing apparatus.

11. A non-transitory computer-readable storage medium storing a computer program, for causing a computer to function as the image capturing apparatus comprising:
a communication interface configured to communicate with an external apparatus;
an operating member;
at least one processor; and
a power source for supplying electrical power to the at least one processor;
wherein the at least one processor functions as a control unit configured to receive operation regarding a predetermined function from the external apparatus via the communication interface and to receive operation regarding a predetermined function from a user via the operating member; and
wherein if electrical powers supplied from the power source due to start of communication with the external apparatus, the control unit performs control to disable the reception of operation by the operating member according to the function whose operation has been received from the external apparatus,
wherein the control unit performs control to disable the reception of operation by the operating member if the function whose operation has been received from the external apparatus is a function to transfer a file from the image capturing apparatus, and the control unit performs control to enable the reception of operation by the operating member if the function whose operation has been received from the external apparatus is a function to capture or playback an image with the image capturing apparatus.

12. An communication apparatus comprising:
a wireless communication interface configured to communicate with an external apparatus wirelessly;
an operating member,
at least one processor; and
a power source for supplying electrical power to the at least one processor;
wherein the at least one processor functions as a control unit configured to receive operation regarding a predetermined function from the external apparatus via the communication interface and to receive operation regarding a predetermined function from a user via the operating member;
wherein if electrical power is supplied from the power source due to start of communication with the external apparatus, the control unit performs control to disable the reception of operation by the operating member according to the function whose operation has been received from the external apparatus,
wherein the control unit performs control to enable the reception of operation by the operating member if the function whose operation has been received from the external apparatus is a function to remotely control the communication apparatus from the external apparatus,
wherein the control unit performs control to disable the reception of operation by the operating member if the function whose operation has been received from the external apparatus is not the function to remotely control the image capturing apparatus from the external apparatus.

13. The communication apparatus according to claim 12, wherein if electrical power is supplied from the power source due to as operation to a power-switch button by a user, the control unit performs control to enable the reception of operation by the operating member.

14. A control method of an image capturing apparatus which comprises: a communication interface configured to communicate with an external apparatus; an operating member; at least one processor, and a power source for supplying electrical power to the at least one processor; the method causing:
the at least one processor to;
receive operation regarding a predetermined function from the external apparatus via the communication interface; and
receive operation regarding a predetermined function froth a user via the operating member;

wherein if electrical power is supplied from the power source due to start of communication with the external apparatus, the method causing the at least one processor to perform control to disable the reception of operation by the operating member according to the function whose operation has been received from the external apparatus, wherein the method causing the at least one processor to perform control to enable the reception of operation by the operating member if the function whose operation has been received from the external apparatus is a function to remotely control the communication apparatus from the external apparatus, wherein the method causing the at least on processor to perform control to disable the reception of operation by the operating member if the function whose operation has been received from the external apparatus is not the function to remotely control the image capturing apparatus from the external apparatus.

15. A non-transitory computer-readable storage medium storing a computer program, for causing, a computer to function as the image capturing apparatus comprising:

a wireless communication interface configured to communicate with an external apparatus wirelessly;

an operating member;

at least one processor; and a power source for supplying electrical power to the at least one processor;

wherein the at least one processor functions as a control unit configured to receive operation regarding a predetermined function from the external apparatus via the communication interface and to receive operation regarding a predetermined function from a user via the operating member;

wherein if electrical power is supplied from the power source due to start of communication with the external apparatus, the control unit performs control to disable the reception of operation by the operating member according to the function whose operation has been received from the external apparatus, wherein the control unit performs control to enable the reception of operation by the operating member if the function whose operation has been received from the external apparatus is a function to remotely control the communication apparatus from the external apparatus, wherein the control unit performs control to disable the reception of operation by the operating member if the function whose operation has been received from the external apparatus is not the function to remotely control the image capturing apparatus from the external apparatus.

* * * * *